United States Patent
Miller

(10) Patent No.: US 9,568,903 B2
(45) Date of Patent: Feb. 14, 2017

(54) SYSTEM AND METHOD FOR CONTROLLING STATES OF A DC AND AC BUS MICROGRID

(71) Applicant: Science Applications International Corporation, McLean, VA (US)

(72) Inventor: Landon Cabell Garland Miller, Tuscaloosa, AL (US)

(73) Assignee: Science Applications International Corporation, McLean, VA (US)

( * ) Notice: Subject to any disclaimer, the term of this patent is extended or adjusted under 35 U.S.C. 154(b) by 316 days.

(21) Appl. No.: 14/330,685

(22) Filed: Jul. 14, 2014

(65) Prior Publication Data

US 2014/0324235 A1 Oct. 30, 2014

Related U.S. Application Data

(63) Continuation of application No. 12/828,637, filed on Jul. 1, 2010, now Pat. No. 8,781,640, which is a
(Continued)

(51) Int. Cl.
*G05B 15/02* (2006.01)
*H02J 3/38* (2006.01)
(Continued)

(52) U.S. Cl.
CPC ............ *G05B 15/02* (2013.01); *H02J 3/381* (2013.01); *H02J 4/00* (2013.01); *H02J 3/32* (2013.01)

(58) Field of Classification Search
CPC ................ H02J 4/00; H02J 3/38; H02J 3/32; G05B 15/02
See application file for complete search history.

(56) References Cited

U.S. PATENT DOCUMENTS 5,804,953 A 9/1998 Bowyer et al. ............... 323/256
6,295,215 B1 9/2001 Faria et al. ..................... 363/37
(Continued)

OTHER PUBLICATIONS

"Characterization of Microgrids in the United States," Final Whitepaper by Resource Dynamics Corporation (Jan. 2005).
(Continued)

*Primary Examiner* — Nathan L Laughlin
(74) *Attorney, Agent, or Firm* — Dawn-Marie Bey; Bey & Cotropia PLLC

(57) ABSTRACT

Systems and methods are described herein for controlling the states of a microgrid module. The microgrid module includes transformers and/or power converters necessary for modifying the input AC or DC power sources to meet the required characteristics of the output power. The microgrid module further comprises a control software module installed on a microgrid computer. The control software module receives data associated with the operating state of the microgrid module. The control software module can access rules associated with each microgrid module operating state to determine whether the microgrid module must transition to a different operating state. If a transition is appropriate, the control software module can apply commands to transition the microgrid module to a different operating state. The control software module can continue to monitor the microgrid module to determine when another state transition is appropriate.

17 Claims, 13 Drawing Sheets

Related U.S. Application Data continuation-in-part of application No. 12/760,654, filed on Apr. 15, 2010, now Pat. No. 8,164,217.

(51) Int. Cl.
*H02J 4/00* (2006.01)
*H02J 3/32* (2006.01)

(56) References Cited

U.S. PATENT DOCUMENTS

| | | | |
|---|---|---|---|
| 6,603,672 B1 | 8/2003 | Deng et al. | 363/37 |
| 6,693,409 B2 | 2/2004 | Lynch et al. | 323/208 |
| 6,724,644 B2 | 4/2004 | Loef | 363/89 |
| 6,765,370 B2 | 7/2004 | Bradley | 323/222 |
| 6,778,414 B2 | 8/2004 | Chang et al. | 363/67 |
| 6,819,087 B2 | 11/2004 | Delmerico | 322/58 |
| 6,847,130 B1 | 1/2005 | Belehradek et al. | 307/66 |
| 7,057,376 B2 | 6/2006 | Cook et al. | 323/207 |
| 7,062,359 B2 | 6/2006 | Bjorklund | 700/286 |
| 7,116,010 B2 | 10/2006 | Lasseter et al. | 307/45 |
| 7,117,044 B2 | 10/2006 | Kocher et al. | 700/34 |
| 7,274,974 B2 | 9/2007 | Brown et al. | 700/295 |
| 7,652,393 B2 | 1/2010 | Moth | 307/64 |
| 7,786,616 B2 | 8/2010 | Naden et al. | 307/64 |
| 7,834,479 B2 | 11/2010 | Capp et al. | 307/21 |
| 7,978,445 B2 | 7/2011 | Ritter | 361/18 |
| 8,067,855 B2 | 11/2011 | Mumtaz et al. | 307/45 |
| 8,140,194 B2 | 3/2012 | Iino et al. | 700/295 |
| 8,164,217 B1 | 4/2012 | Miller | 307/26 |
| 8,183,714 B2 | 5/2012 | McDonnell | 307/82 |
| 8,193,661 B2 | 6/2012 | Jagota et al. | 307/45 |
| 8,289,742 B2 | 10/2012 | Adest et al. | 363/71 |
| 8,315,745 B2 | 11/2012 | Creed | 700/295 |
| 8,345,454 B1 | 1/2013 | Krolak et al. | 363/71 |
| 8,401,709 B2 | 3/2013 | Cherian et al. | 700/291 |
| 8,421,270 B1 | 4/2013 | Miller et al. | 307/65 |
| 8,442,698 B2 | 5/2013 | Fahimi et al. | 700/297 |
| 8,447,435 B1 | 5/2013 | Miller et al. | 700/297 |
| 2002/0036430 A1 | 3/2002 | Welches et al. | 307/18 |
| 2002/0135492 A1 | 9/2002 | Reagan et al. | 340/825.69 |
| 2004/0061380 A1 | 4/2004 | Hann et al. | 307/43 |
| 2004/0124711 A1 | 7/2004 | Muchow et al. | 307/64 |
| 2004/0125618 A1 | 7/2004 | De Rooij et al. | 363/17 |
| 2005/0105306 A1 | 5/2005 | Deng et al. | 363/37 |
| 2006/0092588 A1 | 5/2006 | Realmuto et al. | 361/62 |
| 2007/0013194 A1* | 1/2007 | Calley | F03D 7/047 290/44 |
| 2007/0273211 A1 | 11/2007 | Wang et al. | 307/45 |
| 2008/0103630 A1 | 5/2008 | Eckroad | 700/286 |
| 2008/0143304 A1 | 6/2008 | Bose et al. | 323/205 |
| 2008/0269953 A1 | 10/2008 | Steels et al. | 700/295 |
| 2008/0290143 A1 | 11/2008 | Neklyudov et al. | 228/265 |
| 2008/0298103 A1 | 12/2008 | Bendre et al. | 363/89 |
| 2008/0301757 A1 | 12/2008 | Demarest et al. | 726/1 |
| 2009/0001815 A1 | 1/2009 | Kohler et al. | 307/64 |
| 2009/0027932 A1* | 1/2009 | Haines | H02J 9/062 363/95 |
| 2009/0289507 A1 | 11/2009 | Shiu | 307/131 |
| 2010/0001587 A1 | 1/2010 | Casey et al. | 307/80 |
| 2010/0008117 A1 | 1/2010 | Luthi et al. | 363/126 |
| 2010/0259044 A1* | 10/2010 | Muchow | E03B 11/12 290/43 |
| 2010/0288327 A1* | 11/2010 | Lisi | H01L 31/02021 136/244 |
| 2010/0292853 A1 | 11/2010 | McDonnell | 700/287 |
| 2011/0026282 A1 | 2/2011 | Chapman et al. | 363/65 |
| 2011/0080143 A1 | 4/2011 | Parakulam et al. | 320/162 |
| 2011/0093127 A1 | 4/2011 | Kaplan | 700/292 |
| 2011/0231028 A1 | 9/2011 | Ozog | 700/291 |
| 2011/0278931 A1 | 11/2011 | Johnson, Jr. | 307/66 |
| 2012/0173035 A1 | 7/2012 | Abe | 700/297 |
| 2012/0232709 A1 | 9/2012 | Robinett, III et al. | 700/286 |

OTHER PUBLICATIONS

Specification and Claims for U.S. Appl. No. 12/760,631, filed Apr. 15, 2010.
M. Mahmoodi, R. Noroozian, G. B. Gharehpetian, M. Abedi, "A Suitable Power Transfer Control System for Interconnection Convertor of DC Microgrids," International Conference on Renewable Energies and Power Quality (ICREPQ), Mar. 12-14, 2008, Santander, Spain.
M. Mahmoodi, G. B. Gharehpetian, "Simple Electrical Circuit for Large Signal Modeling of DC Microgrids," International Conference on Renewable Energies and Power Quality (ICREPQ), Apr. 15-17, 2009, Valencia, Spain.
J. Wang, J. Zhang, "Study on a Super Capacitor Energy Storage System for Improving the Operating Stability of Distributed Generation System," DRPT2008, Apr. 6-9, 2008, Nanjing, China.
ICREPQ08 Programme, Santander, 23, 13, Mar. 14, 2008.
Abdallah, et al., "Control Dynamics of Adaptive and Scalable Power and Energy Systems for Military Micro Grids," Construction Engineering Research Laboratory, U.S. Army Corps of Engineers, Dec. 2006.
Balog, R. S., Krein, P. T., "Bus Selection in Multibus DC Power Systems," Electric Ship Technologies Symposium, 2007, ESTS '07, IEEE, pp. 281, 287, May 21-23, 2007.
Barnes, et al., "Real-World Microgrids—An Overview," IEEE International Conference on System of Systems Engineering, pp. 1-8, Apr. 2007.
Seul-Ki, et al., "Dynamic Modeling and Control of Grid-Connected Hybrid Generation System With Versatile Power Transfer," IEEE Trans. Ind. Electron., vol. 55, No. 4, pp. 1677-1688, Apr. 2008.
Specification and Claims for U.S. Appl. No. 13/427,876, filed Mar. 22, 2012.

* cited by examiner

Figure 5A  In-line 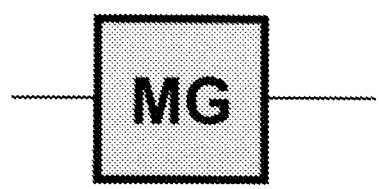
Figure 5B  Parallel 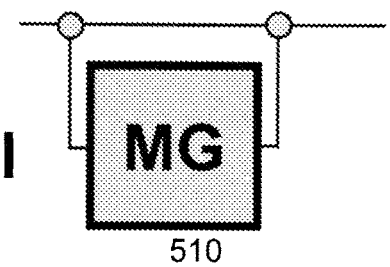
Figure 5C  Series 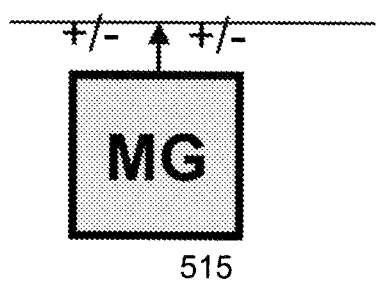

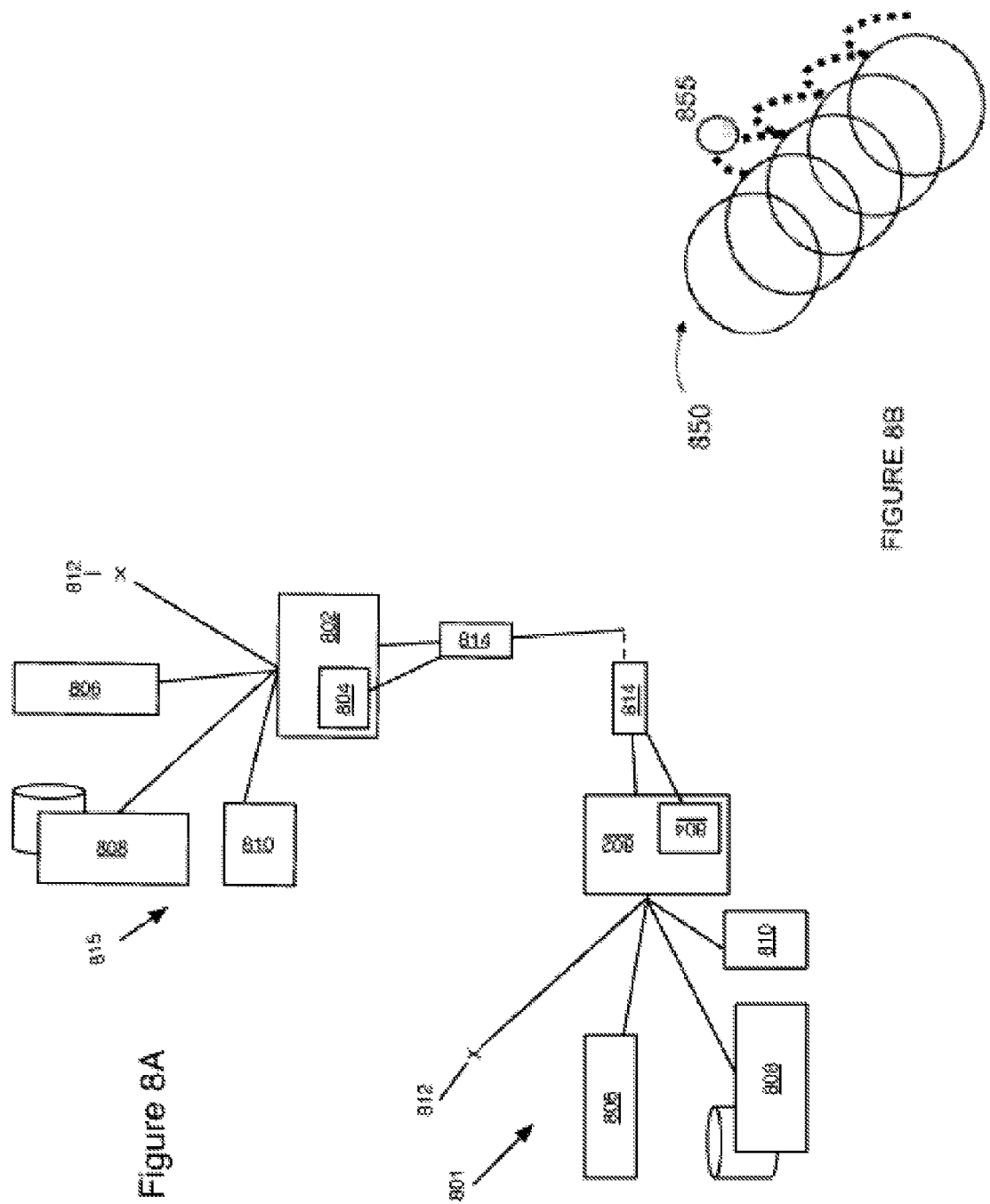

SYSTEM AND METHOD FOR CONTROLLING STATES OF A DC AND AC BUS MICROGRID

CROSS-REFERENCE TO RELATED APPLICATIONS

The present application is a continuation of and claims priority to U.S. patent application Ser. No. 12/828,637 entitled "System and Method For Controlling States of a DC and AC Bus Microgrid," filed on Jul. 1, 2010, which is a continuation-in-part of and claims priority to U.S. patent application Ser. No. 12/760,654 entitled "System and Method for Management of a DC and AC Bus Microgrid," filed on Apr. 15, 2010, now U.S. Pat. No. 8,164,217, both of which are incorporated herein by reference in their entirety. The present application incorporates by reference in their entirety the following co-owned United States patent applications: "System and Method for Routing Power Across Multiple Microgrids Having DC and AC Buses," filed on Apr. 15, 2010 and assigned U.S. patent application Ser. No. 12/760,631, now U.S. Pat. No. 8,447,435; and "System and Method for a Controlled Interconnected DC and AC Bus Microgrid," filed on Apr. 15, 2010 and assigned U.S. patent application Ser. No. 12/760,647, now U.S. Pat. No. 8,421,270.

BACKGROUND OF THE INVENTION

Field of Invention

The present invention relates generally to microgrids for controlling industrial scale distributed energy resources (DERs). More specifically, the present invention relates to a system and method for controlling different operating states of a microgrid with DC and AC inputs and outputs.

Description of Related Art

In general, microgrids are electric networks that are capable of deriving power from a number of sources including the conventional power grid, localized power generating capabilities using renewable generating resources, and alternative power sources such as solar arrays and wind turbines. The microgrid can aggregate power from a number of sources, converting the different formats of power derived from multiple and diverse sources to common voltage and frequency formats that can be subsequently distributed to one or a number of loads. In addition, the microgrid can maintain the reliability of power to one or a number of loads in the face of changing power levels that are derived from the multiple and diverse sources. A microgrid can be coordinated to provide power from a variety of power sources and to provide power with greater reliability. For example, a microgrid can provide an alternate source of power to a site when there is an interruption in the power delivered by the conventional utility power grid. A microgrid also can provide an alternate source of power, such as power from a renewable energy source, when renewable energy is preferred over power delivered by the conventional utility power grid. The power that the microgrid supplies to a site may be derived from a variety of sources including energy storage devices, alternative energy sources such wind or solar power, or from burning conventional fossil fuels. A description of prior art microgrid configurations is found in the whitepaper entitled "Characterization of Microgrids in the United States" prepared for Sandia National Laboratories by Resource Dynamics Corporation dated January 2005 and incorporated herein by reference in its entirety.

In general, there are prior patents and published patent applications directed to various aspects of microgrids. For example, U.S. Pat. No. 6,819,087 discloses a distributed resource stabilization control for microgrid applications. U.S. Pat. No. 6,778,414 relates to a distributed system and methodology for electrical power regulation, conditioning and distribution on an aircraft. U.S. Pat. No. 6,765,370 discloses a system and method for bi-directional power conversion in a portable device. U.S. Published Patent Application No. 2008/0143304 describes a system and method for controlling a microgrid.

The disclosures in these prior patents and published patent applications is hereby incorporated herein by reference in their entirety. However, as described further below, none of these prior patents or published patent applications provides the solutions of the invention described and claimed in this application.

SUMMARY OF THE INVENTION

Summary of the Problem

The present state of the art for microgrid technology has several deficiencies, including the absence of a comprehensive system and method for managing the operation of a microgrid module capable of handling AC to AC, DC to DC, AC to DC, and DC to AC across multiple inputs and outputs. There is a further need to be able to use rules to control the operation of the microgrid module. In particular, there is a need to use data collected from the microgrid module in combination with rules associated with different operating states of the microgrid system, the rules governing the options for transitioning the microgrid system from one operating state to another through the control of components in the microgrid system. Also absent from the prior art is a scalable system capable of managing the transition to different operating states for multiple microgrid modules.

Thus there is a need for advances in the art of electrical microgrids and their management that addresses these deficiencies. Such deficiencies are overcome by the present invention, as is further detailed below.

Summary of the Solution

The present invention addresses the foregoing limitations in the existing art by providing a system and method for managing a microgrid that can operate with AC to AC, DC to DC, AC to DC, and DC to AC across multiple inputs and outputs. The present invention comprises a control software module installed in a computing device coupled to a microgrid module. The control software module can operate as a distributed control point capable of managing one or more microgrid modules. The control software module can use rules associated with different operating states of the microgrid module to control the operation of a microgrid module. The control software module can receive data from software operating sensors and controllable elements in the physical circuitry layer. The control software module uses the data received from the physical circuitry layer in combination with the rules to control the transition from one operating state to another operating state for the microgrid module.

In a first exemplary embodiment, the invention comprises an apparatus for managing a microgrid module comprising a microgrid computer coupled to the circuit layer of the microgrid module. The microgrid computer can comprise a control software module that is in communication with software at the physical circuit layer of the microgrid module. The software at the physical circuit layer operates sensors and controllable elements installed among the components of the physical circuit layer. The control software module can receive data from a sensor in the physical circuit layer, for example, data indicating an interruption in AC power supplied to the microgrid module. The control software module also has access to rules stored in a computer-readable storage device, wherein the rules govern the operation of the microgrid module in different operating states. The control software module analyzes the data received from the physical circuit layer, determines the current operating state of the microgrid module, applies the rules associated with the operating state to the data received from the physical circuit layer, and determines whether and to which operating state to transition the microgrid module. The control software module can send a command to one or more controllable elements, for the example, controllable elements that transition the microgrid module from one operating state to another operating state.

In another exemplary embodiment, the invention comprises a method for managing an operating state of a microgrid module. The exemplary method begins with a microgrid computer storing rules associated with the different operating states of the microgrid module. A control software module can access the rule and, in combination with data received from a sensor in the circuit layer of the microgrid module, the control software module can select a command for altering the operating state of the microgrid module. The control software layer can transmit the command to one or more controllable elements in the circuit layer to transition the microgrid module from one operating state to another operating state. For example, the command may initiate the delivery of power to the microgrid module from an alternate power source.

In yet another exemplary embodiment, the invention comprises a computer-readable medium comprising computer-executable instructions for execution on a microgrid computer. The computer-executable instructions include instructions for a control software module to store rules associated with different operating states of a microgrid module. The computer-executable instructions also include instructions for the control software module to receive data from a sensor in the circuit layer of the microgrid module and to use the received data in combination with the stored rule to select a command for transitioning the operating state of the microgrid module. The computer-executable instructions further include instructions for the control software module to transmit the command to one or more controllable elements in the circuit layer to initiate the transition of the microgrid module from one operating state to another operating state.

These and other exemplary embodiments of the invention will be described in greater detail in the following text and in the associated figures.

BRIEF DESCRIPTION OF THE FIGURES

FIGS. 5A, 5B, and 5C are diagrams illustrating different configurations of a microgrid in connection with a grid and a load in accordance with an exemplary embodiment of the invention.

FIG. 8A is a diagram illustrating multiple microgrids combined into a microgrid set in accordance with an exemplary embodiment of the invention.

FIG. 8B is a diagram illustrating multiple microgrid sets combined in accordance with an exemplary embodiment of the invention.

DETAILED DESCRIPTION

Figure 1:
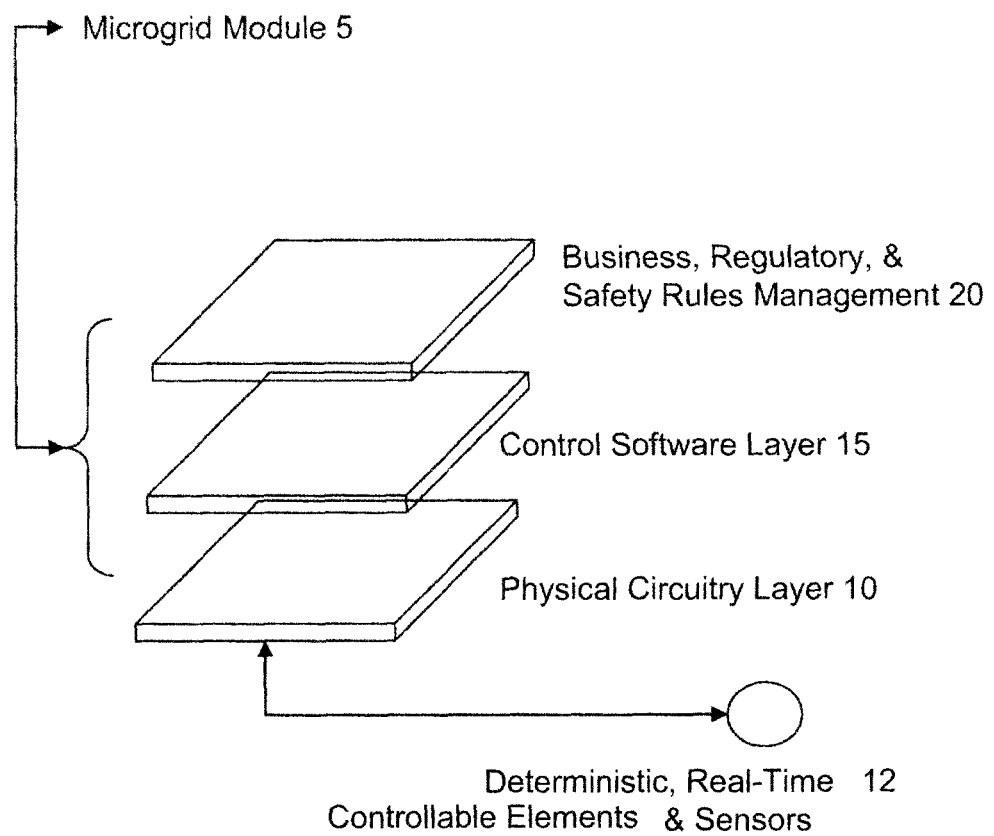
FIG. 1 is a diagram illustrating an overview of components in accordance with an exemplary embodiment of the invention.

The present invention comprises a stationary or portable microgrid module that is fully integrated and can manage both AC and DC inputs and AC and DC outputs. The microgrid module includes a computer comprising software for managing the operations of the microgrid module and a circuit layer comprising AC and DC buses, sensors, controllable elements, and converters. The computer further comprises a control software module and memory for storing rules associated with the different operating states of the microgrid module. The microgrid module also can include or be coupled to energy storage devices such as batteries and capacitors. As described in further detail in related patent applications referenced above, the microgrid module also has the capability of being coupled to one or more other microgrid modules. The integrated control of the connection of multiple DC and AC buses within the microgrid module allows for deterministic real-time control over bi-directional power sources from intermittent and continuous renewable and conventional power sources. Real-time control over the distributed power sources supplying the microgrid module allows the microgrid module to respond to interruptions in one power supply and to transition to another power supply.

The microgrid module of the present invention can accept alternative, renewable, and conventional power inputs into both DC and AC buses and distributes or converts them as appropriate to match standardized bus values across the input, load, macrogrid, and microgrid to microgrid buses. The microgrid module can provide power conversion from DC to DC, AC to AC, AC to DC and DC to AC between the buses under dynamic local control. The microgrid of the present invention also has the capacity to store electrical energy or energy in a form transmutable into electrical energy, such as in a chemical form, for later distribution.

Each microgrid module can comprise various sub-systems and devices that include, but are not limited to, quick-connect/quick-disconnect bus bars and plates, step-up and step-down transformers, patch or inter-connection panels and intelligent breakers and sensors, batteries, ultra-capacitors, flywheels, and other temporary or permanent energy storage devices and systems and their control electronics. The microgrid module can also include power converters, circuitry to accommodate phase imbalance by providing the appropriate neutral connections, and various physical wiring and physical mounting capabilities to provide for adequate stabilization and insulation of the various components in the modular microgrid system.

As referenced above, installed on the microgrid module's computer is a control software module. The control software module can access rules stored in a local computer-readable memory typically located in the microgrid module's computer. The rules can be organized according to sets where each set of rules is associated with an operating state of the microgrid module. The set of rules associated with a microgrid operating state will govern the microgrid when it is operating in that particular operating state. For example, when data collected from the microgrid indicates environmental changes, the rules associated with an operating state will determine whether the microgrid changes operating states or remains in the same operating state. The data the control software module receives from sensors located in the physical circuitry layer of the microgrid module can indicate changes in power demands or changes in available power sources. The control software module can apply the rules stored in the local computer-readable memory to the data received from the sensors to determine which commands to send to the physical circuitry layer. The control software module sends commands to controllable elements located in the physical circuitry layer to control the operation of the microgrid module, including changing the operating state of the microgrid module.

Turning to the figures, in which like numerals indicate like elements throughout the figures, exemplary embodiments of the present invention are illustrated and will be described in the following text. Those of skill in the art will appreciate that the following are merely non-limiting preferred embodiments and alternate embodiments can be implemented in accordance with the invention.

Referring to FIG. 1, an exemplary architecture for a microgrid module 5 can be depicted in three layers. The first layer is the physical circuitry layer 10. The physical circuitry layer comprises the AC and DC input and output buses, the sensors and controllable elements that monitor and control the flow of power into and out of the microgrid module, and other conventional electrical components such as converters and transformers. The sensors and controllable elements that monitor and control the microgrid module can vary from simple sensors and switches to more complex "intelligent" sensors and switches that can include their own software and processing capabilities. Exemplary, non-limiting embodiments of the physical circuitry layer 10 are depicted in greater detail in FIG. 3, FIGS. 4A-4D and in the related application referenced above and entitled "System and Method for a Controlled Integrated DC and AC Bus Microgrid."

The intermediate layer of the architecture for the microgrid is the control software layer 15 and the final layer is the rules management layer 20 which includes business, regulatory and safety rules. The control software layer 15 is typically installed on a local computing device and can be implemented in, for example, active message queuing/message broker software as is known to those of ordinary skill in the art. While the control software layer is typically installed on a local computing device that is part of the microgrid module, those of ordinary skill in the field will understand that software modules controlling the microgrid module or its components can be installed in components of the physical circuit layer or in other computing devices coupled to the microgrid module. The rules management layer 20 also is typically installed on a local computing device and can be implemented in, for example, a virtual machine with a service oriented architecture and use SOAP (Simple Object Access Protocol) as a messaging protocol. The rules management layer 20 can comprise software modules for creating and modifying rules for controlling the operation of the microgrid module.

Figure 2:
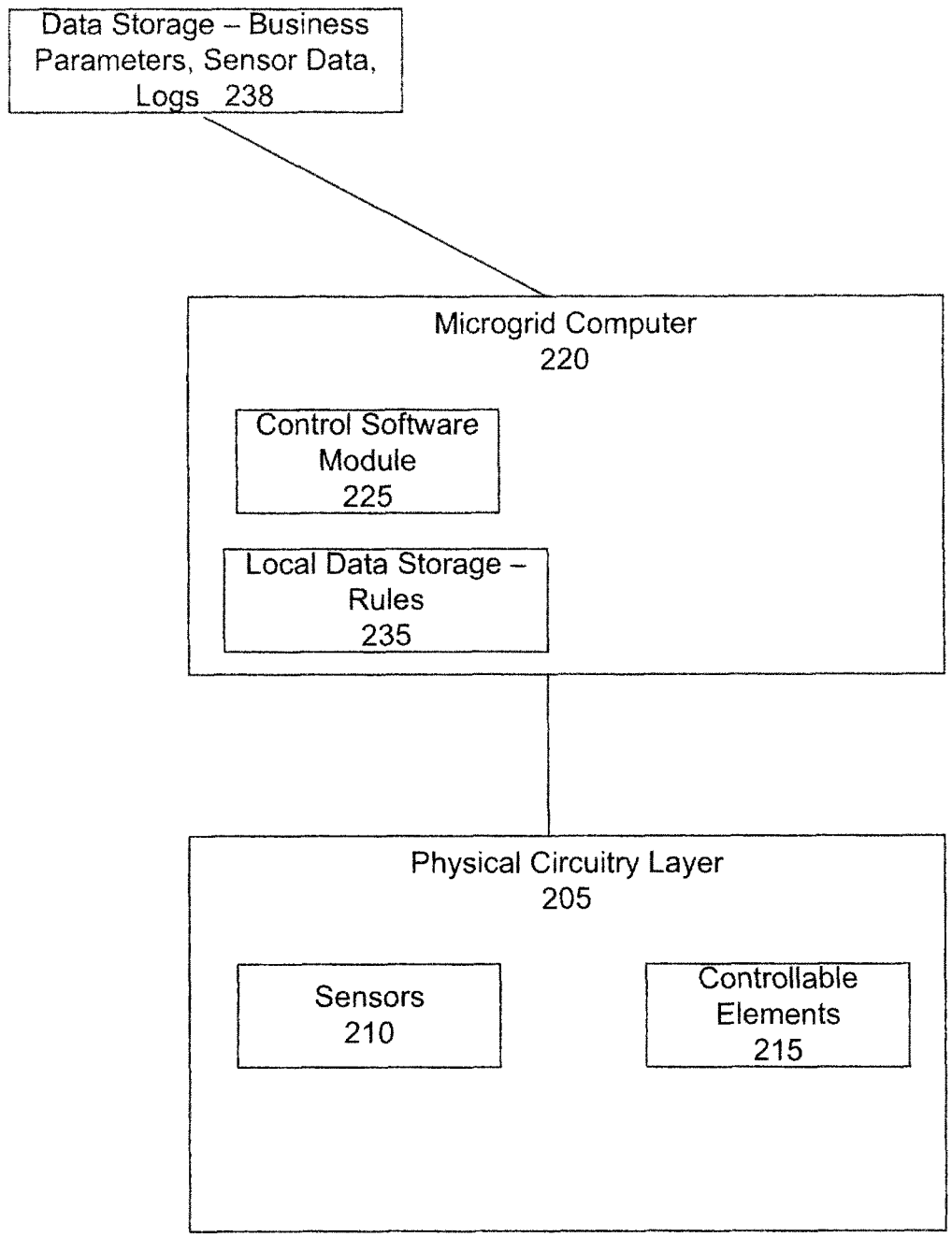
FIG. 2 is a diagram illustrating an overview of components in accordance with an exemplary embodiment of the invention.

Referring to FIG. 2, another exemplary architecture diagram illustrates in further detail the components of an exemplary microgrid module. FIG. 2 shows the physical circuit layer 205 comprising sensors 210 and controllable elements 215. The sensors 210 can collect data from the AC and DC buses (not shown in FIG. 2) and deliver the collected data to the microgrid computer 220. The sensors 210 can detect a variety of power conditions including direction, voltage, current and power levels, and associated changes and the rate of change of these parameters. For example, the sensors can provide data indicating a demand for power, data indicating the flow of power within the microgrid module, and data indicating an interruption in the flow of power to the microgrid module. The controllable elements 215 can include switches, power converters, and other intelligent electrical devices to control the flow of power to and from the microgrid module. Intelligent electrical devices typically include their own software and processing capabilities. The controllable elements 215 can receive commands from the control software module 225 of the microgrid computer 220. In certain embodiments, intelligent controllable elements can perform control functions without communicating with a separate microgrid computer.

The microgrid computer 220 provides a single or multiple user interface to the various controllable microgrid elements. The microgrid computer 220 communicates with the sensors 210 and controllable elements 215 of the physical circuit layer. The microgrid computer 220 comprises installed control software module 225. The control software module 225 can apply rules to the operation of a microgrid module. In the preferred embodiment, each operating state of the microgrid module has its own set of rules governing the behavior of the microgrid module when it is in that particular operating state. The control software module 225 uses the rules to process data received from the sensors 210 and generate commands for sending to the controllable elements 215. The microgrid computer 220 can also comprise a power router software module (not shown) that controls the flow of power to and from the microgrid module and other microgrid modules. For example, in certain embodiments multiple microgrid modules can be coupled in various arrangements.

The microgrid computer 220 also can comprise local data storage 235 and can be coupled to remote data storage 238. The remote storage device 238 can store business parameters, sensor data, and log data. The business parameters can be defined by the operator of the microgrid and may represent a variety of "real world" parameters. As one example, the business parameters can represent the costs of power from the conventional AC power grid and from alternate power sources coupled to the microgrid. In another example, the business parameters can represent expected load demands and preferences for certain power sources. The sensor data that can be stored at the remote data storage device 238 is the data the control software module 225 receives from the sensors 210. This sensor data can be used to adjust the rules based on the operation of the microgrid module. The remote storage device 238 can also store log data describing the operation of the microgrid module over time that can be used for further planning and operation of the microgrid module.

In the preferred embodiment, the local data storage 235 stores the rules, which the control software module 225 uses to control the controllable elements 215. Locally storing the rules assists the control software module 225 to respond quickly to changes in power supplied to the microgrid module. For example, the rules can define when the microgrid module will draw power from a power storage device or from the conventional utility grid. More generally, the rules can control various operating modes or states for the microgrid module including islanding, peak shaving, power conditioning, aggregate load reduction, and the sale of power back to a utility. In alternate embodiments of the invention, software modules and data storage devices can be located either locally or remotely in different arrangements of computing environments.

Although the exemplary embodiments herein are generally described in the context of software modules running on a computing device local to the physical circuitry layer as in FIG. 2, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Figure 2A:
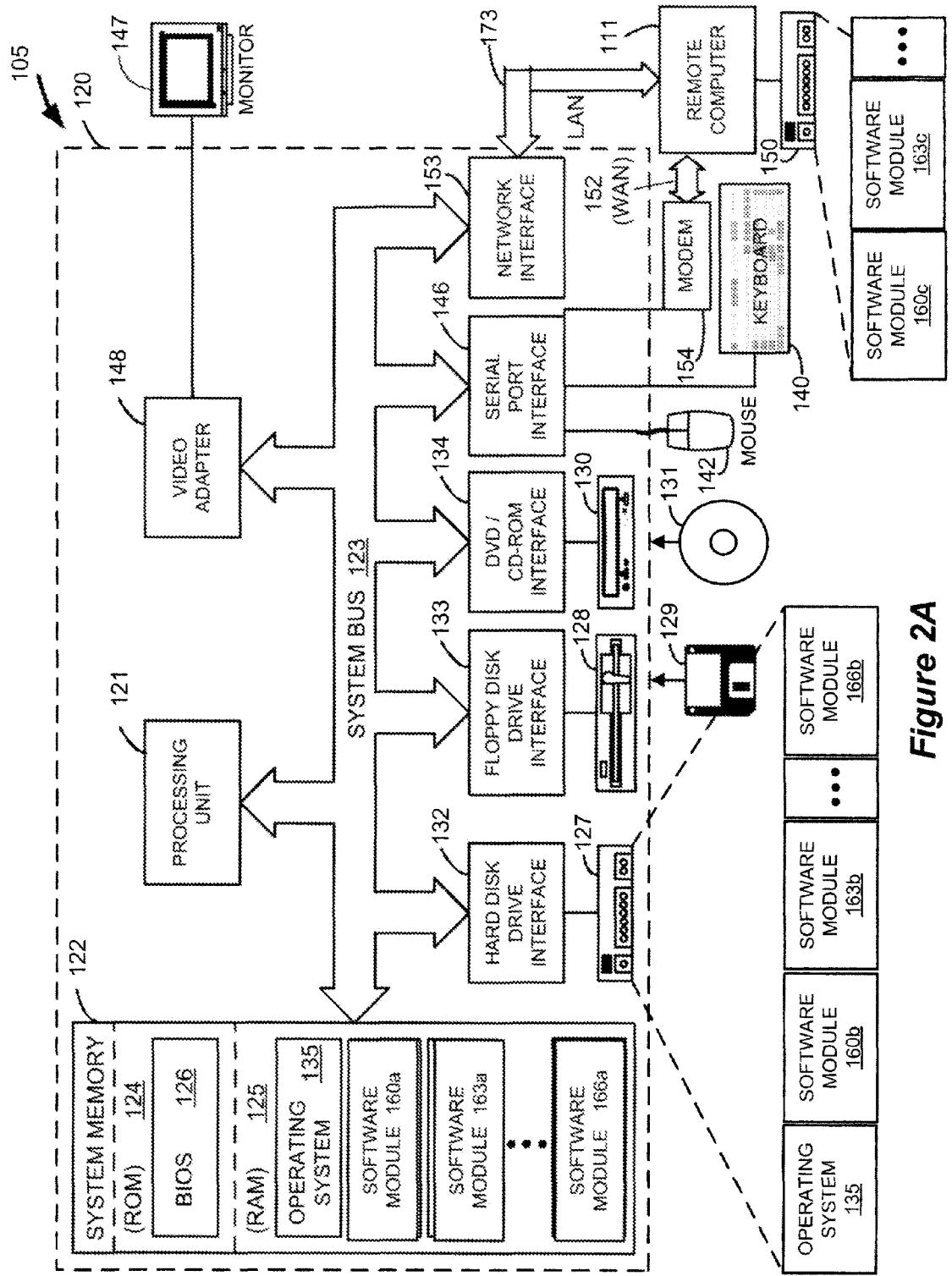
FIG. 2A is a diagram illustrating the components of a computing device in accordance with an exemplary embodiment of the invention.

Referring now to FIG. 2A, aspects of an exemplary computing environment in which the present invention can operate are illustrated. Those skilled in the art will appreciate that FIG. 2A and the associated discussion are intended to provide a brief, general description of the preferred computer hardware and program modules, and that additional information is readily available in the appropriate programming manuals, user's guides, and similar publications.

FIG. 2A illustrates a conventional computing device 120 suitable for supporting the operation of the preferred embodiment of the present invention such as the microgrid computer. As illustrated previously in FIG. 2, the microgrid computer 220 typically comprises multiple software modules. While not required for the computing device implemented in a microgrid module, the computing device 120 illustrated in FIG. 2A operates in a networked environment with logical connections to one or more remote computers 111. The logical connections between computing device 120 and remote computer 111 are represented by a local area network 173 and a wide area network 152. A variety of communication mechanisms can be implemented over the local area network or wide area network, including but not limited to Ethernet, wifi, cellular, microwave, and satellite technologies. Those of ordinary skill in the art will recognize that in this client/server configuration, the remote computer 111 may function as a file server or computer server.

The computing device 120 includes a processing unit 121, such as "PENTIUM" microprocessors manufactured by Intel Corporation of Santa Clara, Calif. The computing device 120 also includes system memory 122, including read only memory (ROM) 124 and random access memory (RAM) 125, which is connected to the processor 121 by a system bus 123. The preferred computing device 120 utilizes a BIOS 126, which is stored in ROM 124. Those skilled in the art will recognize that the BIOS 126 is a set of basic routines that helps to transfer information between elements within the computing device 120. Those skilled in the art will also appreciate that the present invention may be implemented on computers having other architectures, such as computers that do not use a BIOS, and those that utilize other microprocessors.

Within the computing device 120, a local hard disk drive 127 is connected to the system bus 123 via a hard disk drive interface 132. A floppy disk drive 128, which is used to read or write a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134. A user enters commands and information into the computing device 120 by using input devices, such as a keyboard 140 and/or pointing device, such as a mouse 142, which are connected to the system bus 123 via a serial port interface 146. Other types of pointing devices (not shown in FIG. 2A) include track pads, track balls, pens, head trackers, data gloves and other devices suitable for positioning a cursor on a computer monitor 147. The serial port interface 146 can also be used to connect the computing device 120 to other devices or subsystems in the microgrid module. The monitor 147 or other kind of display device is connected to the system bus 123 via a video adapter 148.

The remote computer 111 in this networked environment is connected to a remote memory storage device 150. This remote memory storage device 150 is typically a large capacity device such as a hard disk drive, CD-ROM or DVD drive, magneto-optical drive or the like. Those skilled in the art will understand that software modules are provided to the remote computer 111 via computer-readable media. The computing device 120 is connected to the remote computer by a network interface 153, which is used to communicate over the local area network 173.

In an alternative embodiment, the computing device 120 is also connected to the remote computer 111 by a modem 154, which is used to communicate over the wide area network 152, such as the Internet. The modem 154 is connected to the system bus 123 via the serial port interface 146. The modem 154 also can be connected to the public switched telephone network (PSTN) or community antenna television (CATV) network. Although illustrated in FIG. 2A as external to the computing device 120, those of ordinary skill in the art can recognize that the modem 154 may also be internal to the computing device 120, thus communicating directly via the system bus 123. Connection to the remote computer 111 via both the local area network 173 and the wide area network 152 is not required, but merely illustrates alternative methods of providing a communication path between the computing device 120 and the remote computer 111.

Although other internal components of the computing device 120 are not shown, those of ordinary skill in the art will appreciate that such components and the interconnection between them are well known. Accordingly, additional details concerning the internal construction of the computing device 120 need not be disclosed in connection with the present invention.

Those skilled in the art will understand that program modules, such as an operating system 135 and other software modules 160a, 163a and 166a, and data are provided to the computing device 120 via computer-readable media. In the preferred computing device, the computer-readable media include the local or remote memory storage devices, which may include the local hard disk drive 132, floppy disk 129, CD-ROM or DVD 131, RAM 125, ROM 124, and the remote memory storage device 150.

Figure 3:
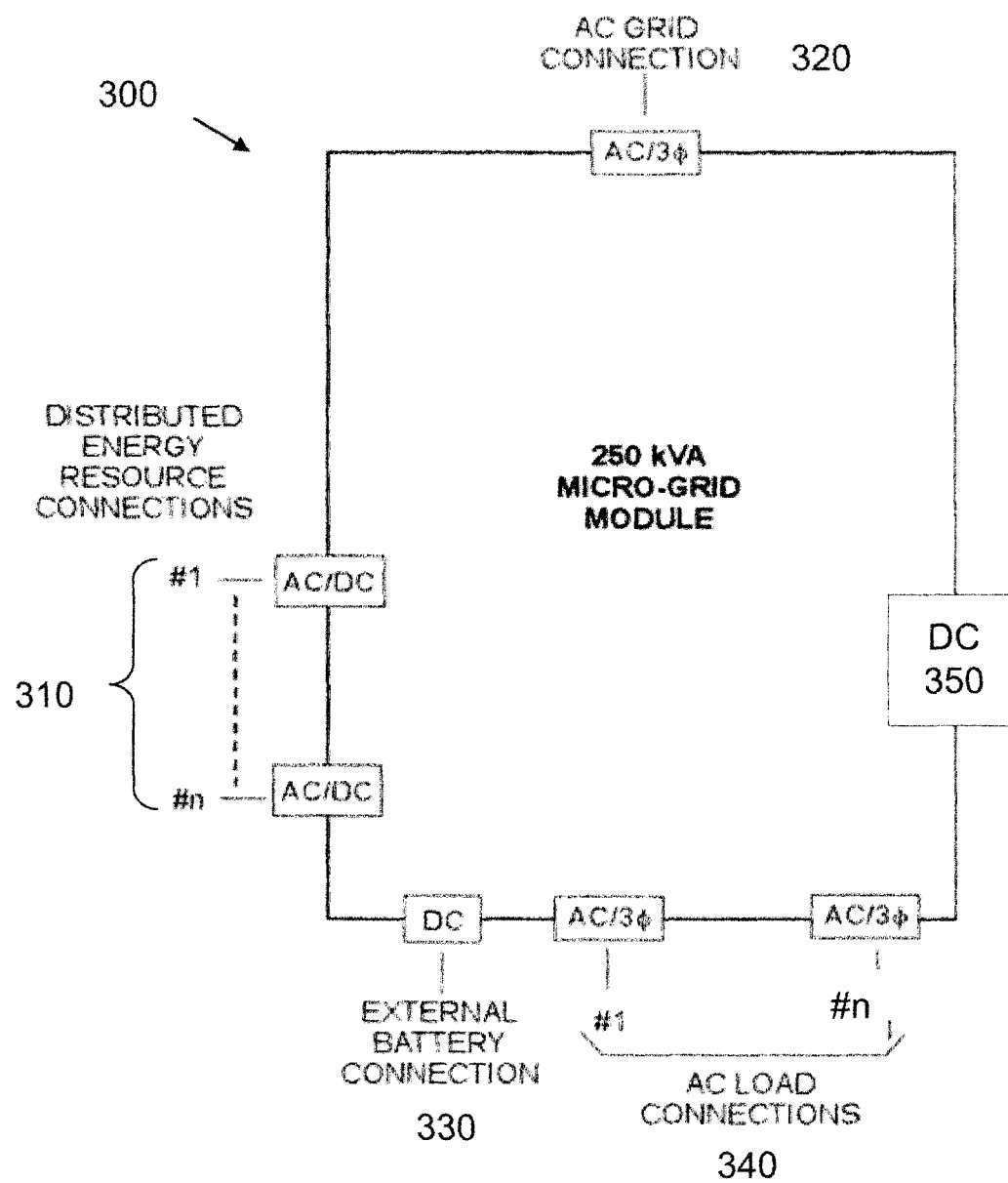
FIG. 3 is a diagram illustrating an overview of the components of the physical circuit layer in accordance with an exemplary embodiment of the present invention.

Referring to FIG. 3, an exemplary microgrid module 300 is shown. As illustrated, the microgrid module 300 may operate from a variety of power sources, including a connection to the local utility grid 320 and one or more distributed energy resources ("DERs") 310 such as internal combustion engine/generator sets, microturbine generators, fuel cells, wind turbines, and photovoltaic arrays. In addition, the microgrid network may have to level the power demands of various loads against the available power sources using energy storage assets 330 which may include batteries (as shown), flywheels, electrochemical capacitors and/or superconducting magnetic energy storage components (SMES).

Although the microgrid module 300 is labeled as a 250 kVA module, that value is merely an example and other microgrid modules within the scope of this invention can be designed to handle smaller or larger amounts of power. The microgrid module may have to provide power to several load systems with a variety of power format requirements including 208 V-3 phase, 480 V-3 phase, 120 V-single phase, 48 VDC, and 300 VDC as examples. As illustrated in FIG. 3, the microgrid module 300 includes one or more AC output buses that supplies power to one or more AC loads 340. Exemplary microgrid module 300 also includes a DC output bus 350 supplying power to a DC load. Processing power to flow from various sources to various load and energy storage assets and from energy storage assets to the loads requires the use of power conversion to interface various incoming and outgoing power formats.

The exemplary embodiments set forth in FIGS. 4A-4D illustrate in greater detail the components of the microgrid module 300 shown in FIG. 3. FIGS. 4A-4D are broken up into four more detailed components of the overview shown in FIG. 3. Those of skill in the art will recognize that the embodiments shown in FIGS. 4A-4D may be modified by adding, removing, or rearranging conventional electrical components without departing from the scope of the invention.

Figure 4A:
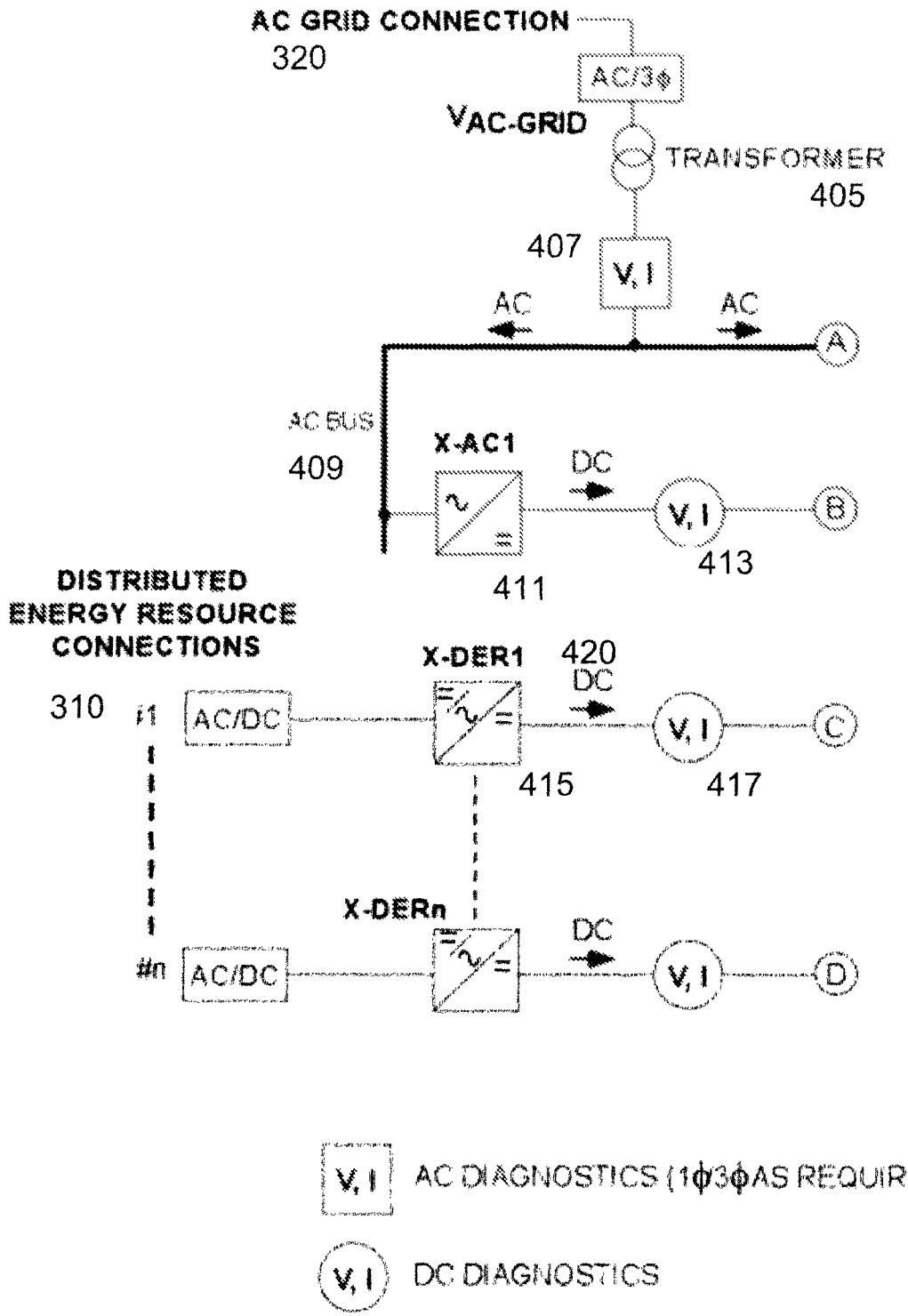
FIGS. 4A through 4D are diagrams illustrating portions of the components of the physical circuit layer in accordance with an exemplary embodiment of the present invention.

Turning to FIG. 4A, DERs 310 are illustrated as connected to DC input bus 420. As illustrated in FIG. 4A, the microgrid module may comprise one or more DC input buses 420 and may be coupled to one or more DERs 310. As explained previously, the DERs 310 can be one or more of a variety of energy sources, including conventional and renewable energy sources. If the DER 310 is an AC power source, a converter 415 can be used to convert the AC power to DC power for transmission onto the DC input bus 420. The DC input bus 420 can also be coupled to a DC diagnostic element 417. The DC diagnostic element 417 can comprise one or more sensors that can communicate with the control software module 225.

FIG. 4A also illustrates an exemplary AC grid connection 320 that connects to the AC grid input bus 409 of the microgrid module. The connection with the AC grid allows power from the conventional utility grid to be fed to the microgrid module. In certain embodiments a transformer 405 will be necessary to adjust the voltage of the power flowing from the utility grid to the microgrid module. An AC diagnostic module 407 can also be located at the AC grid connection 320. The AC diagnostic module can comprise one or more sensors in communication with the control software module 225. The AC diagnostic module 407 can provide data to the control software module 225 about the flow of power from the utility grid to the microgrid module and the control software module 225 can control the power flow at this connection with one or more controllable elements in the physical circuitry layer. The AC grid input bus also can be coupled to converter 411 for converting AC power to DC power that flows to the DC input bus 420. The DC input bus receiving power from the AC grid input bus 409 can also comprise another DC diagnostic element 413.

Figure 4B:
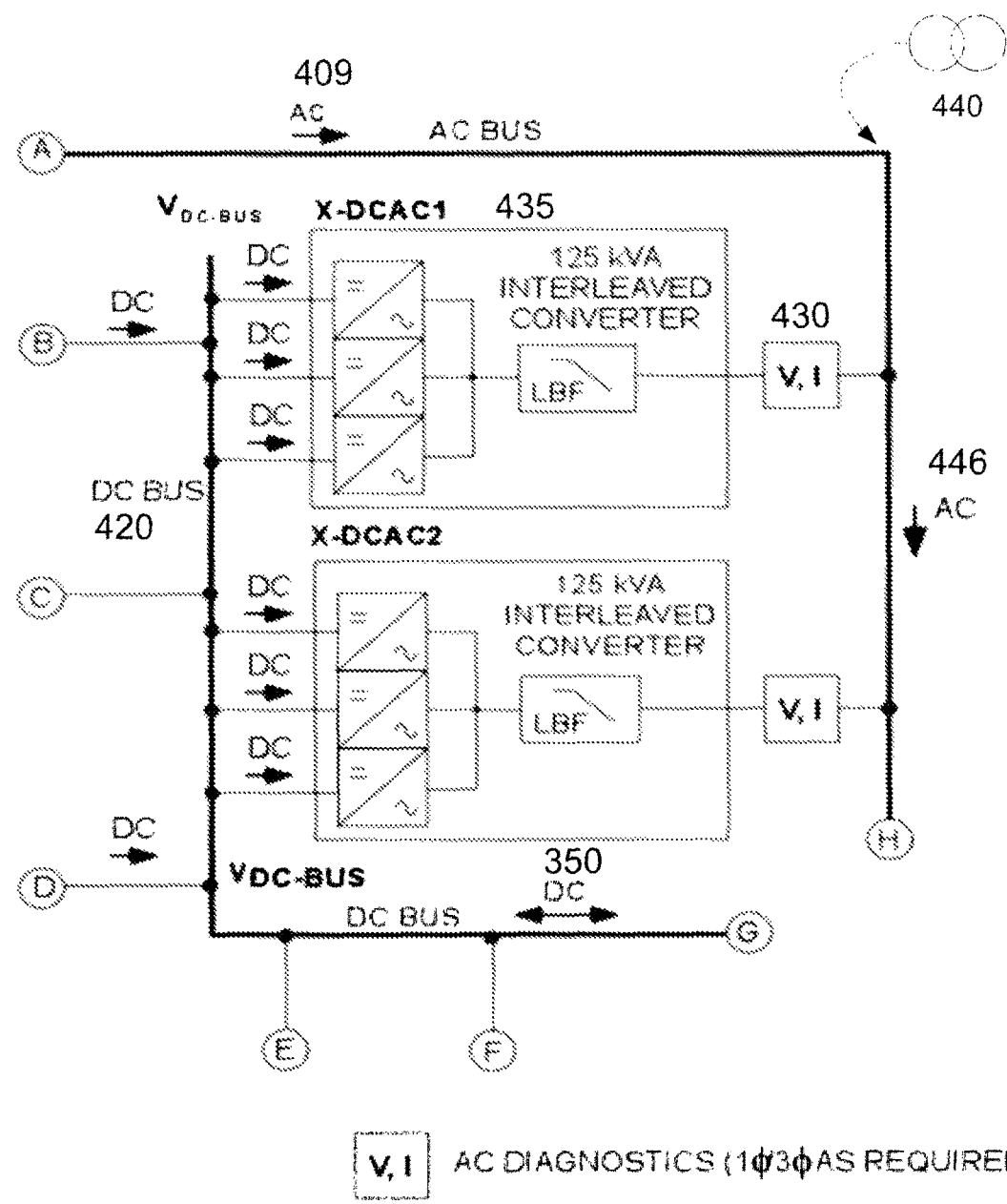
Figure 4C:
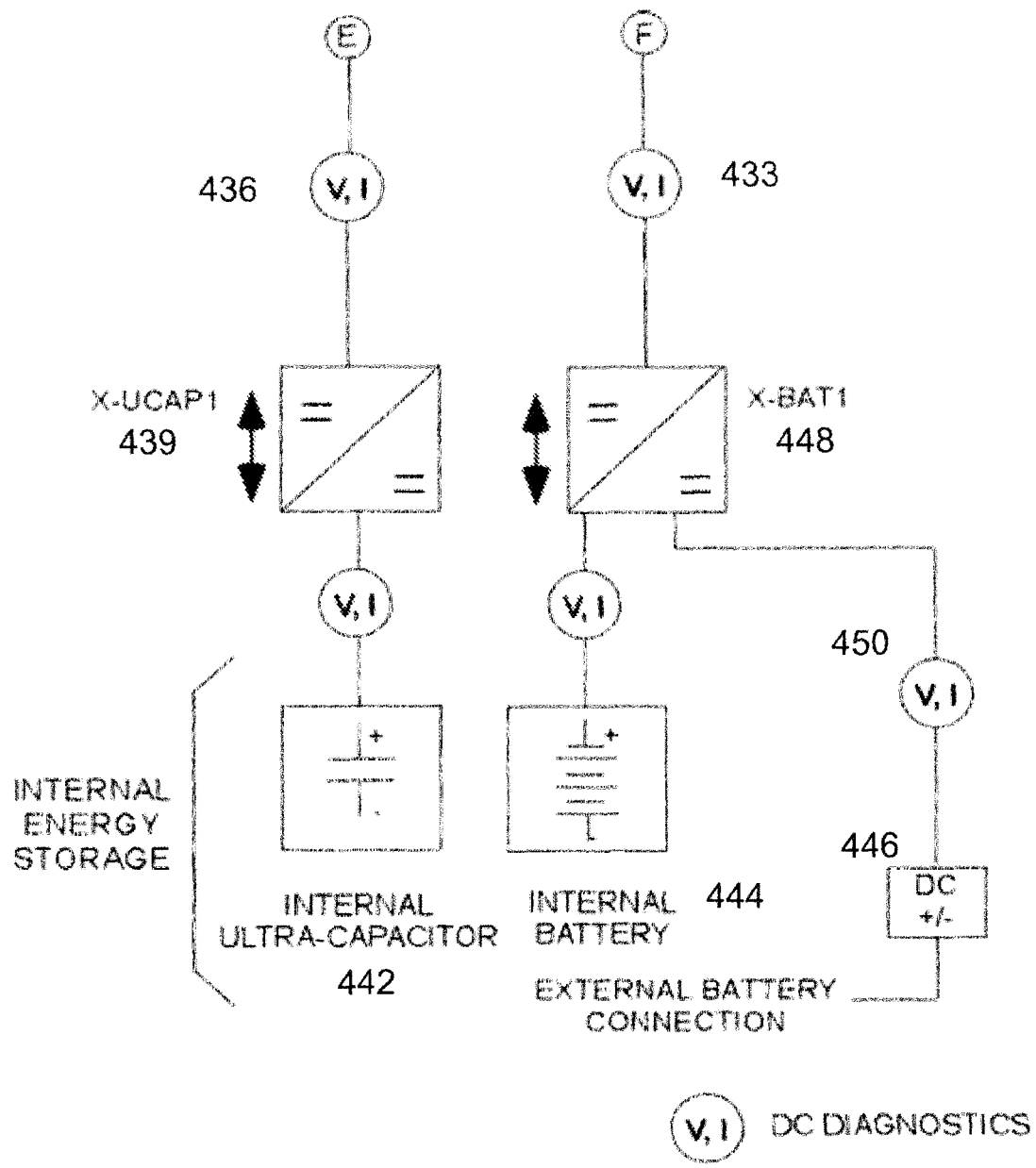
Figure 4D:
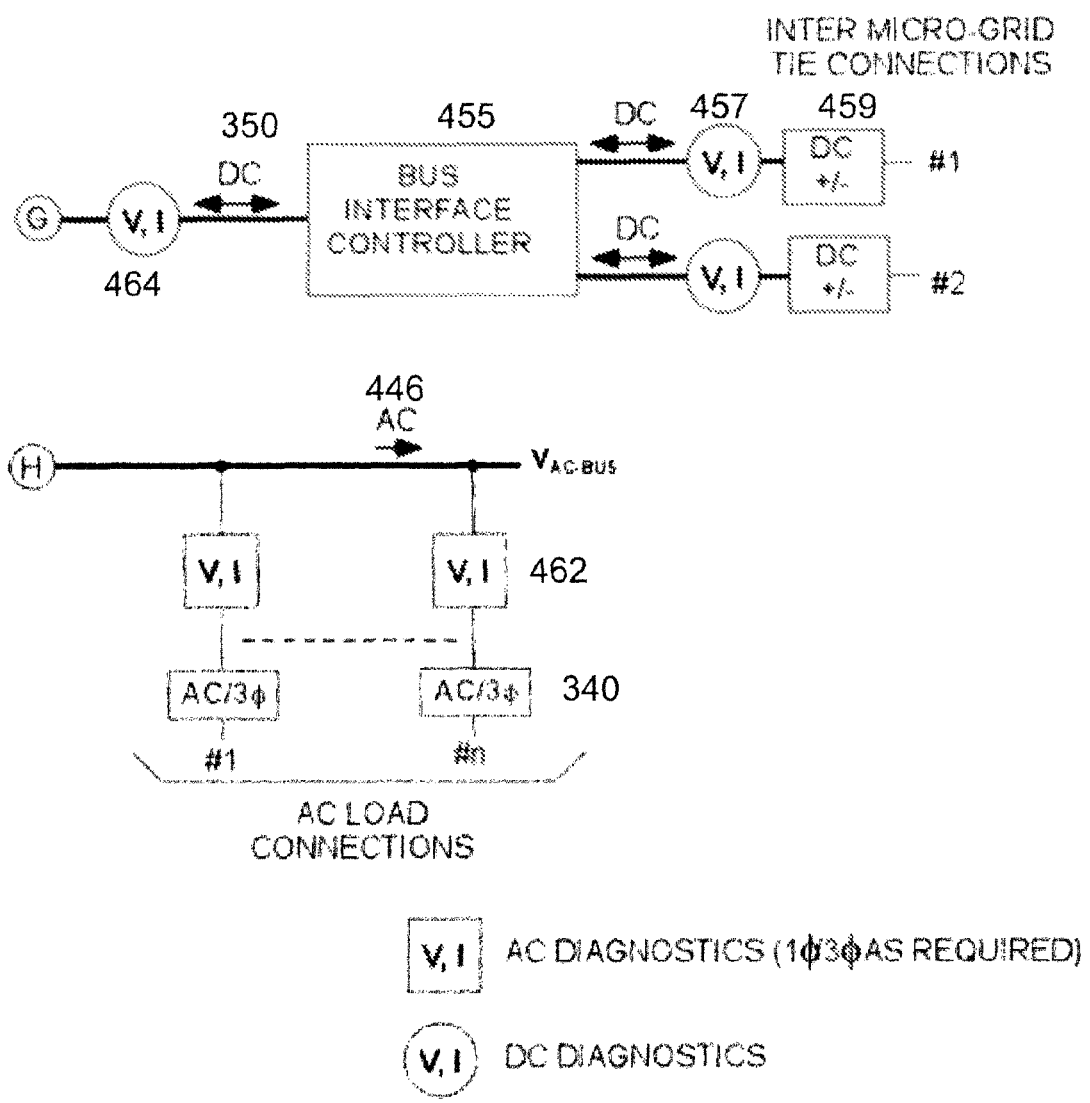

Referring to the exemplary illustration in FIG. 4B, one can see that connections A, B, C, and D from FIG. 4A have corresponding connection points A, B, C, and D in FIG. 4B. These connection points at A, B, C, and D do not represent physical elements of the microgrid module, but merely illustrate the connection points between FIGS. 4A and 4B. FIGS. 4C and 4D have a similar arrangement and FIGS. 4A-4D are intended to provide a more detailed illustration of the overview of the exemplary embodiment shown in FIG. 3.

In FIG. 4B, the DC input bus 420 has two primary connections. First, the DC input bus 420 can be coupled to a DC output bus 350 for supplying DC power from the microgrid module. The DC input bus 420 and DC output bus 350 may be linked through a power converter (not shown in FIG. 4B) if needed to adjust the input and output voltages. While the embodiment described in connection with FIGS. 4A through 4D includes a DC input bus and a DC output bus, those of skill in the art will recognize that two distinct DC buses are not required. For example, other microgrid modules may comprise a single DC bus that receives DC power at one point and delivers DC power at another point.

Second, the DC input bus can feed one or more converters 435 implemented to convert DC power to AC power for distribution on the AC output bus 446. The AC output bus 446 is coupled to the AC grid input bus 409 and a transformer 440 can be placed between the AC grid input bus 409 and the AC output bus 446 if needed to adjust the input and output voltages. As illustrated in exemplary FIG. 4B, an AC diagnostic element 430 can be placed between converter 435 and the AC output bus 446. The AC diagnostic element 430 can comprise one or more sensors allowing the control software module 225 to monitor and control the operation of the physical circuit layer of the microgrid module.

FIG. 4B includes connection points E and F to the elements of FIG. 4C. Exemplary FIG. 4C shows additional components of the exemplary microgrid module including internal ultra-capacitor 442 and internal battery 444. In alternate embodiments, the internal energy storage components shown in FIG. 4C may not be internal parts of the microgrid module but may be external and coupled to the microgrid module. For example, as shown in FIG. 4C, the DC output bus 350 (not shown in FIG. 4C) may be coupled to an external battery via connection 446. The energy storage devices shown in FIG. 4C are coupled to the DC output bus 350 via converters 439 and 448. These converters function to convert the DC voltage level associated with the energy storage elements with the voltage level of the DC output bus 350. Specifically, the voltage level associated with each energy storage device may be substantially different from that of the DC bus. Moreover, the voltage levels associated with each energy storage device may vary substantially depending on the state-of-charge of the energy storage device. In general, as an energy storage device is charged, its associated voltage increases. Similarly, in general, as an energy storage device is discharged while delivering energy to the microgrid module, the associated voltage decreases. Power converters 439 and 448 can adjust voltage levels so that the voltage level of the DC output bus 350 and the energy storage devices is consistent.

The energy storage devices also are coupled to one or more DC diagnostic elements 436, 433 and 450. As with other diagnostic elements previously discussed, the DC diagnostic elements 436, 433 and 450 can comprise one or more sensors in communication with the control software module 225. The energy storage devices illustrated in FIG. 4C are merely representative and those of skill in the art will appreciate that other arrangements of energy storage devices can be placed either internal or external to the microgrid module and perform a similar function of storing energy provided by the microgrid module and subsequently providing it back to the microgrid module as needed.

Referring to FIG. 4D, exemplary elements connected to points G and H from FIG. 4B are illustrated. Point G shows the connection of the DC output bus 350 to a bus interface controller 455. The bus interface controller 455 controls the flow of power between the microgrid module illustrated in FIGS. 4A-4D and one or more other microgrid modules. As described in further detail in the related patent applications referenced above, multiple microgrid modules can be coupled and the bus interface controller 455 manages the flow of power between the coupled microgrid modules. The bus interface controller 455 typically comprises control and power converter circuits that communicate with software modules installed on the microgrid computer 220. One or more microgrid tie connections 459 connect the DC output bus 350 to other microgrid modules. The DC output bus can also comprise one or more DC diagnostic elements 464 and 457 which can perform sensing functions as described previously.

FIG. 4D also illustrates exemplary elements connected to the AC output bus 446 at point H. One or more AC load connections 340 can be coupled to the AC output bus 446. The 3-phase AC load connection shown in FIG. 4D is merely exemplary and a variety of AC loads having different voltages and phase combinations can be connected to the AC output bus 446 of the microgrid module. The AC load connections can also comprise AC diagnostic elements similar to those described previously.

Referring to FIGS. 5A, 5B, and 5C, exemplary configurations for a microgrid are illustrated. Although not shown in FIGS. 5A, 5B, and 5C, in each case a utility power grid is to the left of the microgrid and a load is to the right of the microgrid. In FIG. 5A, the microgrid 505 is positioned in-line such that power from the utility power grid on the left is physically isolated from the load on the right. In FIG. 5B, the microgrid 510 is connected in parallel via switches to the bus between the utility power grid on the left and the load on the right. FIG. 5C is described as the series configuration because the utility power grid on the left and the load on the right remain connected via the bus and the microgrid 515 uses phase management to control the flow of power to the utility power grid, to the load, or to both. The configurations shown in FIGS. 5A and 5B are the preferred embodiments for the present invention in that they provide the microgrid with the greatest control over the operational states.

Those of skill in the art will recognize that the microgrid configurations shown in FIGS. 5A, 5B, and 5C are merely exemplary and that other microgrid configurations can be implemented in connection with the present invention. For example, in alternate embodiments of the invention, the microgrid may only provide power to one of a load and a utility power grid and may not be coupled to both a load and a utility power grid. Likewise, alternate embodiments of the invention may comprise multiple microgrid components.

Figure 6:
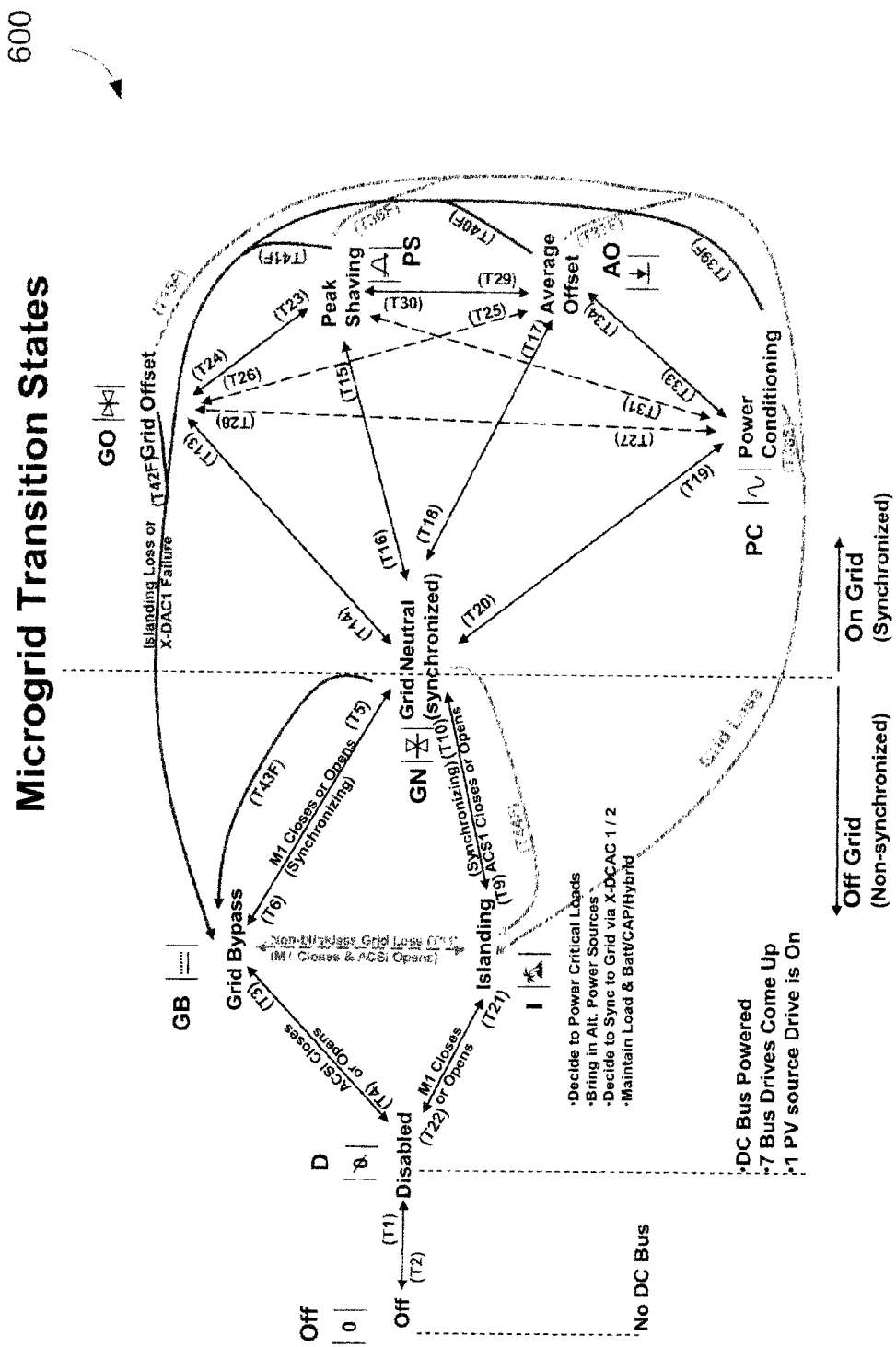
FIG. 6 is a diagram illustrating the different operating states of a microgrid in accordance with another exemplary embodiment of the invention.

Referring to FIG. 6, an exemplary state diagram showing the various operating states of a microgrid module is illustrated. The operating states and the paths for transitioning between different operating states shown in FIG. 6 are merely exemplary and alternate embodiments of the invention can comprise microgrid modules with different operating states and different paths for transitioning between operating states. As shown in exemplary FIG. 6, there are rules associated with each operating state of the microgrid module that govern which other operating states are available for transition. For example, in the embodiment illustrated in FIG. 6, the microgrid module cannot transition directly from the disabled state to the grid neutral state. Instead, the microgrid module must transition from the disabled state to either the grid bypass state or the islanding state before reaching the grid neutral state.

The first state illustrated in FIG. 6 is the Off state where there is no power in the microgrid module. In the Off state, all switches in the microgrid module are typically open so that power cannot flow into the microgrid module from the AC power grid or from distributed energy resources. In the Off state, the microgrid computer 220 can operate on battery power to monitor the microgrid module to ensure no power flows into the microgrid module.

The next microgrid operating state shown in the exemplary diagram in FIG. 6 is the disabled state. In the disabled state, power is available to the microgrid module from one or more power sources, including the utility power grid, alternative or renewable power sources, and power storage devices. However, in the disabled state, the switches to the various power sources remain open so that power is not flowing to the microgrid module, but instead, the microgrid module is "standing by."

The exemplary diagram shown in FIG. 6 illustrates the next operating state as the grid bypass state. As indicated in exemplary FIG. 6, in order to transition from the disabled state to the grid bypass state, the switch (ACS1) connecting the microgrid module to the utility power grid is closed. In the grid bypass state, the microgrid module is receiving power from the utility power grid and feeding that power to one or more loads. In the grid bypass state the microgrid module is essentially transparent to the utility power grid and the switches connecting the distributed energy resources to the microgrid module remain open. In contrast, in the grid neutral operating state, the switches (M1) connecting the distributed energy resources to the microgrid module are closed. However, the microgrid module is managing the flow of power such that the utility power grid provides all the power needed by the load. In the grid neutral state, the distributed energy resources are connected to the microgrid module, but are merely standing by and are not supplying power to the load or the utility power grid.

The grid offset state is the next operating state illustrated in the exemplary diagram in FIG. 6. In the grid offset state, the microgrid module is configured to provide power upstream, in other words, to sell power back to the utility power grid. The rules associated with the grid offset operating state govern the flow of power from the microgrid module to the utility power grid and to loads. For example, the rules can be configured to prioritize the delivery of power so that the microgrid module delivers power to critical loads and sells power back to the utility power grid, but does not deliver power to loads categorized as having a lower priority. In other arrangements, the rules can be modified to set other priority levels for different loads.

In FIG. 6, the next exemplary operating state is the peak shaving state. In the peak shaving state, the microgrid module supplies power from the power storage devices and/or the distributed energy resources to the utility power grid during periods of peak power demand. The periods of peak power demand are typically of short duration and the additional power the microgrid module supplies to the utility power grid can assist in addressing these periods of peak demand. The average offset operating state is somewhat similar to the peak shaving state, but is directed to a longer term supply of power from the microgrid module to reduce the average maximum power use. As with the peak shaving state, in the average offset state, the microgrid module is supplying power from the power storage devices and/or the distributed energy resources coupled to the microgrid module. The microgrid module can supply power to one or both of loads connected to the microgrid module and to the utility power grid.

The next exemplary operating state illustrated in FIG. 6 is the power conditioning state. In the power conditioning state, the microgrid module can supply power from power storage devices and from distributed energy resources to address peak demand periods on the utility power grid and to restore the quality of power flowing on the utility power grid. Power the microgrid module supplies during periods of peak demand can assist in avoiding brown outs. In contrast, power supplied at other times to restore the quality of the power on the utility power grid can assist in addressing problems such as phase jitter, cycle phasing and phase frequency adherence.

The last exemplary operating state illustrated in FIG. 6 is the island state. In the island state, there is a loss of power supplied from the utility power grid and all power supplied to the loads connected to the microgrid module is from the power storage devices and/or the distributed energy resources coupled to the microgrid module. The rules associated with the island state govern the prioritization of loads in the event load shedding is necessary, for example, due to limits in the amount of available power. The rules associated with the island state also govern whether and when the microgrid module may transition to another operating state such as the grid neutral state. For example, if during the island operating state sensors in the physical circuit layer of the microgrid module detect that power becomes available on the utility power grid, the rules may direct that the microgrid module transition to the grid neutral state where the utility power grid again begins supplying power to the loads connected to the microgrid module.

Figure 7A:
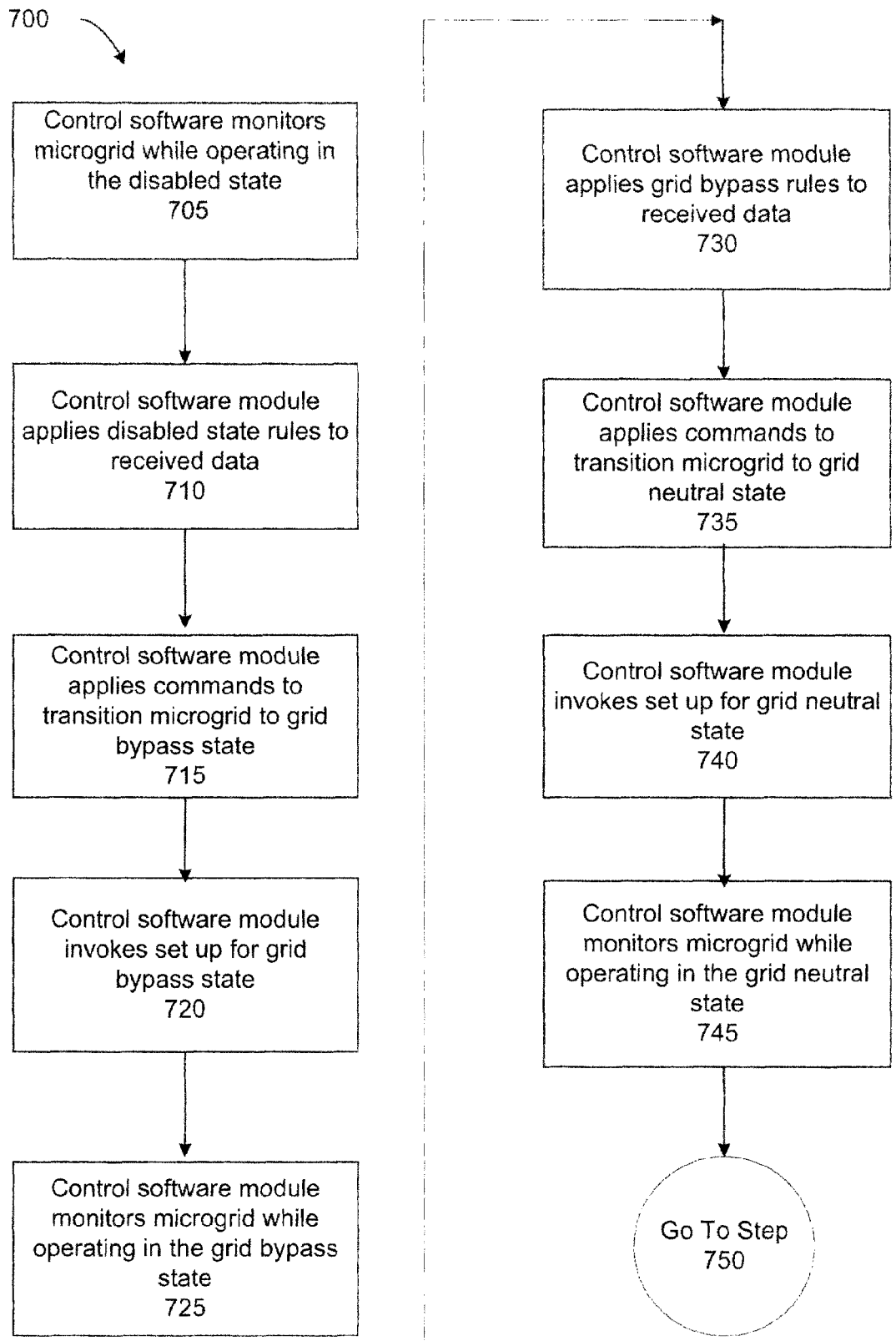
FIGS. 7A and 7B are flow chart diagrams illustrating a process for transitioning to different operating states of a microgrid in accordance with an exemplary embodiment of the present invention.
Figure 7B:
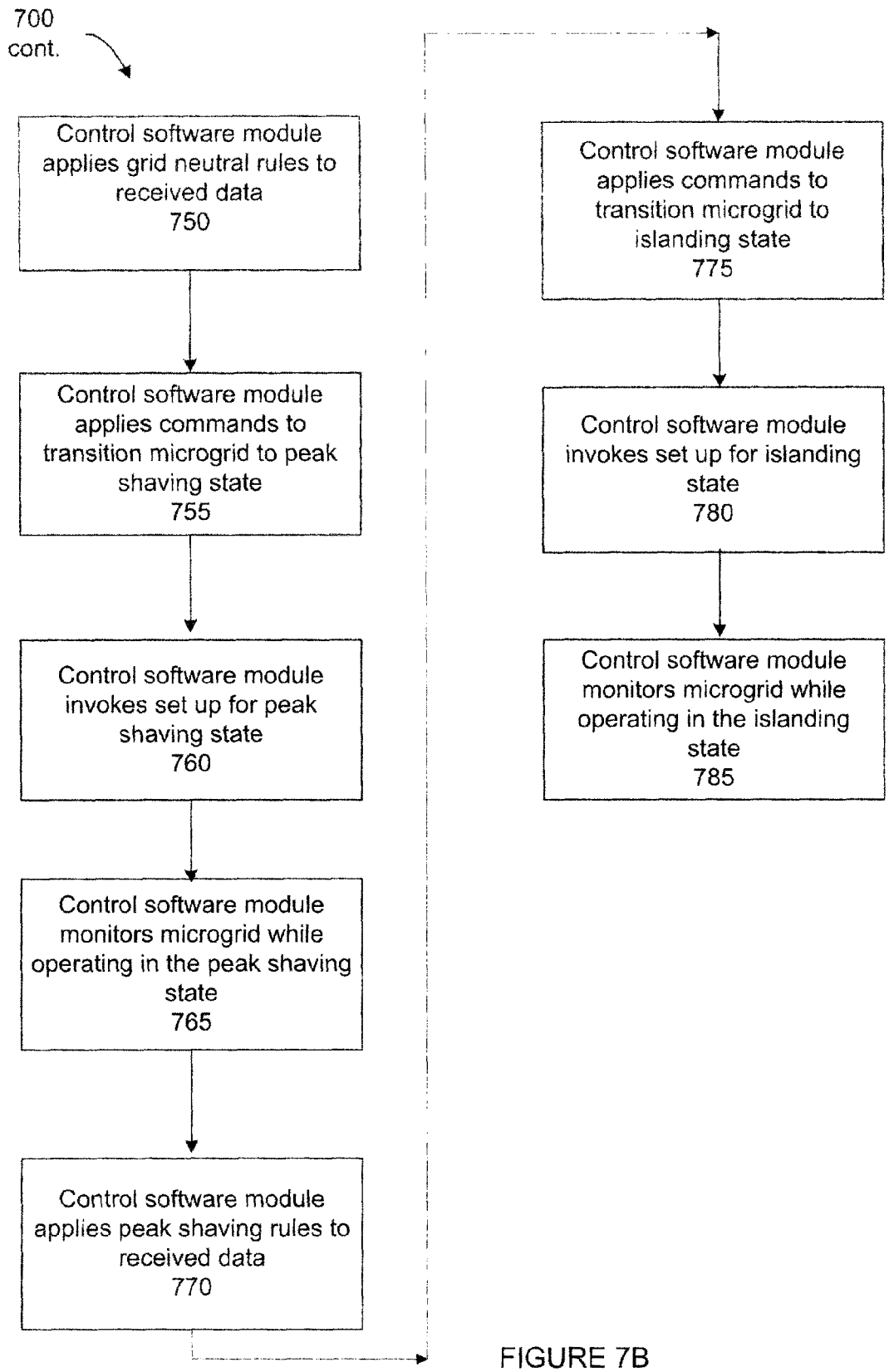

Referring now to FIGS. 7A and 7B, a flow chart diagram illustrates an exemplary process 700 for the operation of the microgrid module and the transitions to different operating states. While the steps of exemplary process 700 are shown in sequence, those skilled in the art will appreciate that not all of the steps in process 700 are required and the steps can occur in other sequences. For example, certain operating states of the microgrid module have more than one option for transitioning to another operating state and those options for transitioning to other operating states can be modified using the rules associated with the operating state. Exemplary process 700 begins with step 705 where the control software module 225 monitors the microgrid module 300 while the microgrid module 300 is operating in the disabled state. The monitoring is accomplished using sensors 210 located in the physical circuit layer 205 of the microgrid module 300. For each of the monitoring steps in exemplary process 700, the monitoring step can include determining in which operating state the microgrid module 300 is currently operating. In step 710, the control software module 225 can apply the state rules associated with the disabled operating state to the data collected from the sensors 210 to determine whether the microgrid module 300 should transition to a different operating state. The state rules associated with the disable operating state govern the other operating states to which the microgrid module 300 may transition. If the control software module 225 determines that a transition is required by the rules, commands are applied to the controllable elements 215 to transition the microgrid module to a grid bypass state in step 715. For example, in transitioning to a bypass state, the switch connecting the microgrid module 300 to the utility power grid is closed. In connection with the transition to the bypass state, the control software module 225 also invokes the set up procedures for the grid bypass state in step 720. For example, invoking the set up procedures can involve powering other elements in the microgrid module and preparing the distributed energy resources to be available to provide power in the event of a transition to another operating state.

Referring to step 725, the control software module 225 monitors the microgrid module 300 while it operates in the grid bypass state. The monitoring step can include determining in which operating state the microgrid module 300 is currently operating. In step 730, the control software module 225 applies the rules associated with the grid bypass state to the received data. If the control software module 225 determines that a state transition is required by the rules, in step 735 commands are applied to close the switches connecting the distributed energy resources and power storage devices to the microgrid module and to transition the microgrid module 300 to the grid neutral state. The grid neutral state is one of the operating states the rules permit the microgrid module 300 to transition to from the grid bypass state. As with previous state transitions, the set up procedures associated with the transition to the grid neutral state are invoked in step 740 to prepare the microgrid module 300 for operation in the grid neutral state.

In step 745, the control software module 225 monitors the operation of the microgrid module 300 while operating in the grid neutral state. The control software module 225 applies the rules associated with the grid neutral state to data received from sensors 210 in step 750 to determine whether a state change is necessary. As an example, if the sensors 210 indicate a peak demand period on the utility power grid and the grid neutral rules indicate the microgrid module 300 should respond by supplying power to the utility power grid during a peak demand period, in step 755, the control software module will command the microgrid module to transition to a peak shaving state. In connection with the transition to the peak shaving state, the control software module 225 invokes the set up procedures for the peak shaving state in step 760. The set up procedures can include preparing the distributed energy resources and/or the power storage devices to deliver power to the utility power grid.

Turning to step 765, the control software module 225 monitors the microgrid module 300 while operating in the peak shaving state. In connection with monitoring the microgrid module, the software module 225 receives data from sensors 210 and applies the rules associated with the peak shaving state to the data in step 770. If the rules require a transition to an islanding state, for example, in the event power from the utility grid is temporarily unavailable, the control software module 225 applies commands to the controllable elements 215 in step 775 to transition the microgrid module 300 to the islanding state. As one example, the control software module 225 can direct the microgrid module 300 to open the switch connecting the microgrid module 300 to the utility power grid. In step 780, the control software module 780 invokes the set up procedures for operating the microgrid module in the operating state. For example, the set up procedures can be related to the priority levels of the loads coupled to the microgrid module 300. As another example, the set up procedures can be related to which distributed energy resources or power storage devices are used to power the loads. In step 785, the control software module 225 continues to monitor the microgrid module 300 while it operates in the islanding state.

The steps in exemplary process 700 are merely one illustration of the various states to which the microgrid module can transition. Those of skill in the art will appreciate that not all of the steps illustrated in process 700 are required in order to operate the microgrid module and in other embodiments different rules can be associated with different operating states.

Referring to FIG. 8A, an example of a microgrid set is illustrated. The microgrid set illustrated in FIG. 8A comprises two microgrid systems 801 and 815 that have been linked to operate together. The microgrid systems illustrated in FIG. 8A comprise a microgrid module 802 controlled by a microgrid computer 804. The microgrid module 802 is coupled to distributed energy resources including a solar source 806, a renewable source 808 (such as pyrolysis or hydropower), and a wind power source 812. The microgrid module 802 can also be coupled to energy storage devices 810 such as batteries or capacitors. A power router device 814 can control the flow of power between the two microgrid systems 801 and 815. Although the microgrid set illustrated in FIG. 8A comprises two microgrid systems, in other embodiments more than two microgrid systems can be linked together to form a microgrid set. Furthermore, as shown in FIG. 8B, multiple microgrid sets can also be linked together to form microgrid unit 850. In FIG. 8B, microgrid unit 850 can comprise a master power router 855 that controls the flow of power between the microgrid sets that make up the microgrid unit 850.

In conclusion, the invention, as described in the foregoing exemplary embodiments, comprises a microgrid module that can receive either AC or DC power from a variety of power sources and supply either AC or DC power to a load or storage device. The microgrid module comprises a control software module that can access rules stored locally on a microgrid computer. The rules are organized into sets where each set of rules is associated with a particular operating state of the microgrid module. The rules govern, among other things, the other operating states to which the microgrid module can transition.

The embodiments set forth herein are intended to be exemplary. From the description of the exemplary embodiments, equivalents of the elements shown herein and ways of constructing other embodiments of the invention will be apparent to practitioners of the art. For example, conventional electrical components can be added or modified within the microgrid but remain within the scope of the invention. Similarly, the methods described herein are merely exemplary and the control software module can be designed in a variety of ways to control the operation of the microgrid module. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

I claim:

1. An apparatus for managing a change in an operating state of a micro grid to manage flow of power between one or more distributable power sources, a utility power grid and one or more loads comprising:

a microgrid computer comprising:

a computer readable storage device storing a first operating state business parameter rule associated with a first operating state of the microgrid and a second operating state business parameter rule associated with a second operating state of the microgrid and a third operating state business parameter rule associated with a third operating state of the microgrid; and a control software module applying the first operating state business parameter rule to data received from a circuit layer of the microgrid to determine a first command and applying the first command to transition the microgrid from the first operating state to a second operating state;

the control software module further applying the second operating state business parameter rule to data received from the circuit layer to determine a second command and applying the second command to transition the microgrid from the second operating state to a third operating state;

the control software module further applying the third operating state business parameter rule to data received from the circuit layer to determine a third command and applying the third command to transition the microgrid from the third operating state to a fourth operating state;

the circuit layer comprising:

an AC input bus coupled to an AC output bus and a first converter; a DC bus coupled to a second converter;

the first converter coupled to the DC bus;

the second converted coupled to the AC output bus;

at least a first sensor coupled to the DC bus, the at least a first sensor sending data to the control software module, wherein the AC input bus and the DC bus are coupled to one or more distributable power sources and a utility power grid;

the control software module receiving the at least a first sensor data and generating one of the first, second or third commands in response thereto when the data meets one of the first, second or third operating state business parameter rules;

at least a first controllable element receiving the first command to transition the microgrid from the first operating state to the second operating state, wherein the first operating state of the microgrid is an off state wherein no power is available at the microgrid from the one or more distributable power sources or the utility power grid and the second operating state of the microgrid is a disabled state wherein power is available to the microgrid from the one or more distributable power sources and the utility power grid, but no power is flowing therethrough, the at least a first controllable element powering up the DC bus in response to the first command;

at least a second controllable element receiving the second command to transition the microgrid from the second operating state to the third operating state, wherein the third operating state of the microgrid is a grid neutral state wherein power is available to the utility power grid and the one or more loads through the microgrid from the one or more distributable power sources but only power from the utility power grid is passing through the microgrid to the one or more loads; and the at least a second controllable element receiving the third command to transition the microgrid from the third operating state to the fourth operating state, wherein the fourth operating state of the microgrid is an on grid state which includes the microgrid directing power from the one or more distributable power sources to at least one of the utility power grid and the one or more loads.

2. The apparatus of claim 1, wherein the on grid state is a grid offset state, wherein the microgrid directs power upstream to the utility power grid and to one or more loads.

3. The apparatus of claim 1, wherein the on grid state is a peak shaving state, wherein the microgrid directs power upstream to the utility power grid from the one or more distributable power sources during predetermined periods of peak power demand.

4. The apparatus of claim 1, wherein the on grid state is an average offset state, wherein the microgrid directs power upstream to the utility power grid from the one or more distributable power sources to reduce a predetermined average maximum power usage of the utility power grid.

5. The apparatus of claim 1, wherein the on grid state is a power conditioning state, wherein the microgrid directs power upstream to the utility power grid from the one or more distributable power sources to address a quality of power supply issue including at least one of jitter, cycle phasing and phase frequency adherence.

6. The apparatus of claim 1, wherein the first controllable element is a switch coupled to the AC input bus.

7. The apparatus of claim 1, wherein the first controllable element is a switch coupled to the DC bus.

8. The apparatus of claim 1, wherein the circuit layer comprises a second sensor coupled to the AC input bus.

9. The apparatus of claim 1, wherein the DC bus is coupled to one or more distributable power sources selected from the group consisting of a solar energy source, a wind energy source, a biofuel energy source, and a power storage device.

10. A method for managing a change in an operating state of a microgrid to manage flow of power between one or more distributable power sources, a utility power grid and one or more loads comprising:

storing in a computer readable storage device a first operating state business parameter rule associated with a first operating state of the microgrid, wherein the first operating state of the microgrid is an off state wherein no power is available at the microgrid from the one or more distributable power sources;

receiving, at a control software module, first data from at least a first sensor in a circuit layer of the microgrid;

applying, by the control software module, the first operating state business parameter rule to the received data to determine a first command;

applying, by control software module, the first command to transition the microgrid from the first operating state to a second operating state, wherein the second operating state of the microgrid is a disabled state wherein power is available to the microgrid from the one or more distributable power sources, but no power is flowing therethrough;

invoking, by the control software module, a set up procedure for the second operating state wherein the set up procedure includes powering up a component of the micro grid;

monitoring, by the control software module, the microgrid while the microgrid operates in the second operating state;

receiving, at a control software module, second data from the at least a first sensor;

applying, by the control software module, a second operating state business parameter rule to the received second data to determine a second command;

applying, by the control software module, the second command to transition the microgrid from the second operating state to a third operating state, wherein the third operating state of the microgrid is a bypass state wherein power is available to the microgrid from the one or more distributable power sources but only power from the utility power grid is passing through the microgrid to the one or more loads;

invoking, by the control software module, a set up procedure for the third operating state;

monitoring, by the control software module, the microgrid while the microgrid operates in the third operating state;

receiving, at a control software module, third data from the at least a first sensor;

applying, by the control software module, a third operating state business parameter rule to the received third data to determine a third command;

applying, by the control software module, the third command to transition the microgrid from the third operating state to a fourth operating state, wherein the fourth operating state of the microgrid is a grid on state which includes the microgrid directing power from the one or more distributable power sources to at least one of the utility power grid and the one or more loads;

invoking, by the control software module, a set up procedure for the fourth operating state; and monitoring, by the control software module, the microgrid while the microgrid operates in the fourth operating state.

11. The method of claim 10, wherein the on grid state is a grid offset state, wherein the third data triggers the third command for the microgrid to direct power upstream to the utility power grid and to one or more loads.

12. The method of claim 10, wherein the on grid state is a peak shaving state, wherein the third data triggers the third command for the microgrid to direct power upstream to the utility power grid from the one or more distributable power sources during predetermined periods of peak power demand.

13. The method of claim 10, wherein the on grid state is an average offset state, wherein the third data triggers the third command for the microgrid to direct power upstream to the utility power grid from the one or more distributable power sources to reduce a predetermined average maximum power usage of the utility power grid.

14. The method of claim 10, wherein the on grid state is a power conditioning state, wherein the third data triggers the third command for the microgrid to direct power upstream to the utility power grid from the one or more distributable power sources to address a quality of power supply issue including at least one of jitter, cycle phasing and phase frequency adherence.

15. The method of claim 10, wherein the circuit layer comprises:

an AC input bus coupled to an AC output bus and a first converter;

a DC bus coupled to a second converter;

the first converter coupled to the DC bus;

the second converted coupled to the AC output bus;

the least a first sensor coupled to the DC bus, the at least a first sensor sending data to the control software module, wherein the AC input bus and the DC bus are coupled to one or more distributable power sources and a utility power grid.

16. The method of claim 15, wherein the first command transitioning the microgrid from the first operating state to the second operating state causes the microgrid to power up the DC bus.

17. The method of claim 15, wherein the second command transitioning the microgrid from the second operating state to the third operating state causes the microgrid to receive power via the DC bus.

* * * * *